United States Patent
Iwamoto et al.

(10) Patent No.: US 8,811,001 B2
(45) Date of Patent: Aug. 19, 2014

(54) ELECTRONIC DEVICE

(75) Inventors: Akira Iwamoto, Osaka (JP); Jun Sato, Osaka (JP); Ryo Yonezawa, Kyoto (JP); Toshiya Senoh, Nara (JP); Kenichi Shindo, Osaka (JP); Masashi Toyota, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 46 days.

(21) Appl. No.: 13/568,136

(22) Filed: Aug. 7, 2012

(65) Prior Publication Data

US 2013/0044418 A1   Feb. 21, 2013

(30) Foreign Application Priority Data

Aug. 19, 2011 (JP) ................................. 2011-179861
Jul. 18, 2012 (JP) ................................. 2012-159741

(51) Int. Cl.

| | |
|---|---|
| *H05K 5/00* | (2006.01) |
| *H05K 7/00* | (2006.01) |
| *G06F 3/02* | (2006.01) |
| *G06F 1/18* | (2006.01) |
| *G06F 1/16* | (2006.01) |
| *H01R 13/52* | (2006.01) |

(52) U.S. Cl.
CPC .............. *G06F 1/1616* (2013.01); *G06F 1/182* (2013.01); *H01R 13/5213* (2013.01); *H01R 13/5202* (2013.01)
USPC ............ 361/679.01; 361/679.42; 361/679.43; 361/679.45; 361/679.58; 345/169

(58) Field of Classification Search
CPC ................ H05K 5/0026; H05K 5/026; H05K 2201/10159; G06F 1/16; G06F 1/133225
USPC ........... 361/679.01–679.61, 807–832; 341/22
See application file for complete search history.

(56) References Cited

U.S. PATENT DOCUMENTS

2009/0219676 A1\* 9/2009 Murakata ................. 361/679.01
2012/0099266 A1\* 4/2012 Reber et al. .............. 361/679.26

FOREIGN PATENT DOCUMENTS

JP        2007-066592 A    3/2007

\* cited by examiner

*Primary Examiner* — Jenny L Wagner
*Assistant Examiner* — Jerry Wu
(74) *Attorney, Agent, or Firm* — James W. Judge (57) ABSTRACT

A casing 1, a terminal plate 30 that is exchangeably mountable in an opening 23 formed in the casing 1; and a water sealing component 50 disposed around a terminal 31 formed on the terminal plate 30, are provided. A flange 24 is formed inside the opening 23 so as to surround a center of the opening and project toward the center of the opening. When the terminal plate 30 is mounted on the flange 24, an outer side surface of the terminal plate 30 is flush with a surface 21 of the casing in a portion where the opening is formed. With this structure, an electronic device can be obtained that is reliably waterproof and/or dustproof in a connection terminal portion that is exchangeable so as to enhance an expandability.

4 Claims, 10 Drawing Sheets

ELECTRONIC DEVICE

BACKGROUND

1. Field

The present disclosure relates to waterproof and dustproof electronic devices having enhanced protection against, for example, water and dust.

2. Description of the Related Art

In recent years, electronic devices, such as notebook computers, have been provided with enhanced protection against exposure to water, drip, and dust that tends to occur when the electronic devices are used outdoors in various environmental conditions. Typically, such electronic devices are provided with a lid component that covers, for example, a terminal portion of the electronic device since the terminal portion is likely to be exposed to exterior conditions, such as dust or liquids, or the like, as a result of having a cable or the like, connected thereto. Such exposure to liquid, dust, or the like may cause the electronic device to malfunction.

Furthermore, electronic devices, such as notebook computers, have been proposed that are customizable to a user's specific needs while, at the same time, ensuring that the electronic devices retain their fundamental information processing capability. In order to customize the electronic devices to meet the user's specific needs, as described above, electronic devices having an exchangeable input/output terminal that has an expandability is useful for the user. An exchangeable connection terminal that is connectable to various connectors may be provided as such an input/output terminal having the expandability.

Japanese Laid-Open Patent Publication No. 2007-066592 suggests an electronic device which includes an input/output terminal that not only has the aforementioned expandability, but also is dustproof and waterproof, for example, an electronic device, as a transmitter, for use in a parabolic antenna, that is exposed to weather conditions. In the aforementioned electronic device as a transmitter, an intermediate connector is connected to a circuit substrate in a casing, and an external connector, which is disposed so as to be exposed to the exterior of the casing, is connected to the intermediate connector. In the conventional electronic device of this type, both an N-type connector and an F-type connector in compliance with the standard for a signal transmission line can be used as the external connector, and therefore expandability of the connection terminal is provided, while simultaneously ensuring that the intermediate connector portion is waterproof and dustproof.

SUMMARY

In the configuration disclosed in Japanese Laid-Open Patent Publication No. 2007-066592, the intermediate connector is disposed in the casing of the electronic device so as to be waterproof, so that entry of rain water and the like from the exterior can be prevented. However, the device being waterproof depends on the assumption that the external connector is connected to the intermediate connector, and further an antenna cable is constantly connected to the external connector. Therefore, it is not possible to use the aforementioned configuration for terminal portions of electronic devices, such as personal computers, that have a connection terminal to which a connector of a cable for connecting to an external device is connected only when it is appropriate to do so.

An object of the present disclosure is to make available an electronic device that is reliably waterproof and/or dustproof in a connection terminal portion that is exchangeable so as to enhance the expandability.

An electronic device of the present disclosure includes: a casing; a terminal plate that is exchangeably mountable in an opening formed in the casing; and a water sealing component disposed around a terminal formed on the terminal plate. A flange is formed inside the opening so as to surround a center of the opening and project toward the center of the opening. When the terminal plate is mounted on the flange, an outer side surface of the terminal plate is flush with a surface of the casing in a portion where the opening is formed.

In the electronic device having the structure described above, when a terminal plate that has an expandability is mounted on the flange formed inside the opening so as to surround the center of the opening, the outer side surface of the terminal plate is flush with the surface of the casing. Therefore, not only when the water sealing component is disposed on the terminal plate on the outer side thereof, but also when the water sealing component is disposed on the terminal plate on the inner side thereof, entry of water or the like into the casing from a peripheral portion of the detachably mountable terminal plate can be prevented, thereby obtaining an electronic device having not only expandability, but also being waterproof and/or dustproof.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of patent claims.

First Embodiment

Figure 1:
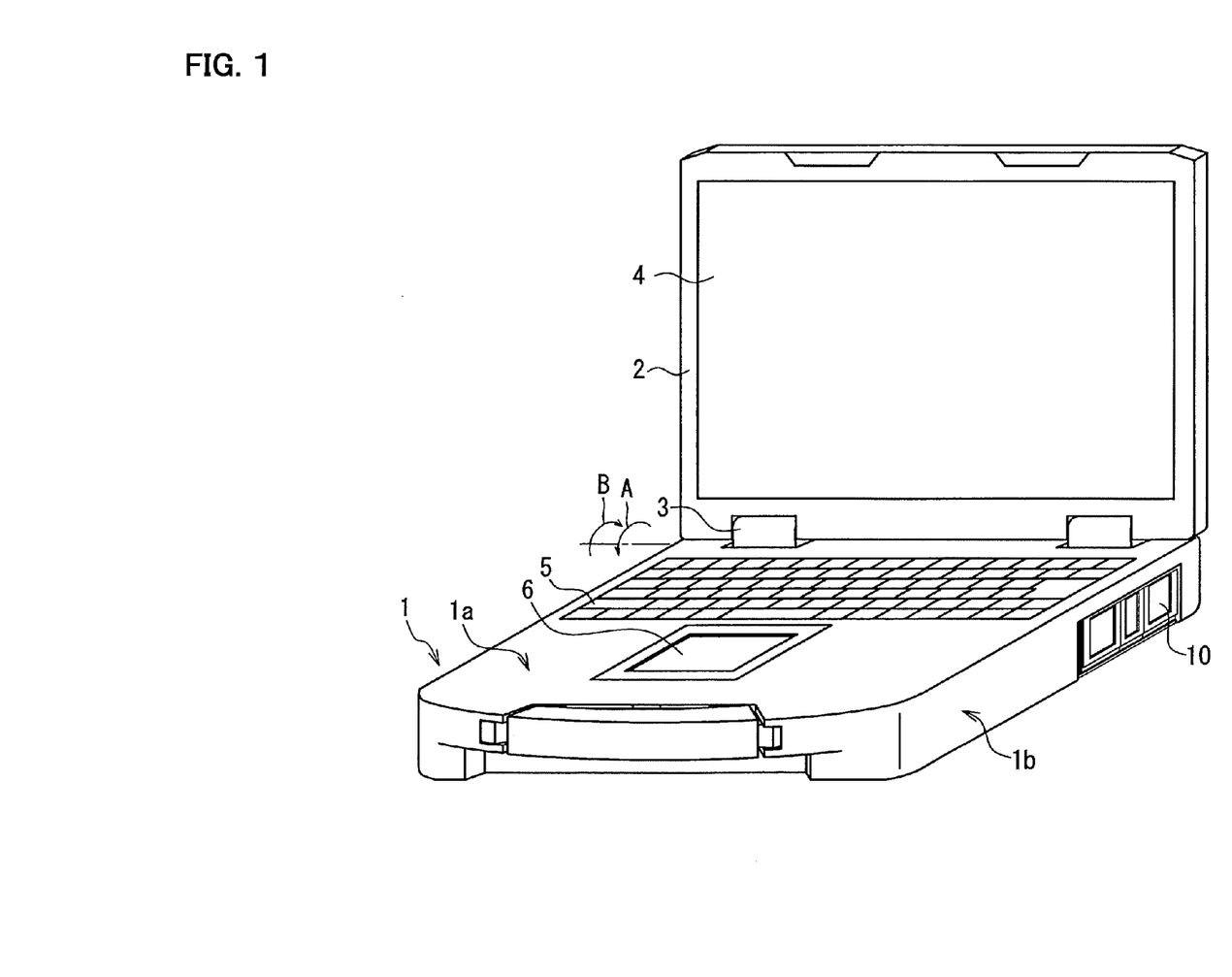
FIG. 1 is a perspective view of a schematic exemplary structure of a notebook computer according to an embodiment.

FIG. 1 is a perspective view of an outer appearance of a notebook computer representing an exemplary electronic device according to the present embodiment. The present embodiment will be described by using a notebook computer as an exemplary electronic device. However, the electronic device may be a device that includes at least an exchangeable terminal portion that is reliably waterproof and/or dustproof. The notebook computer according to the present embodiment has a lid component that covers the terminal portion so as to ensure waterproof property and/or dustproof property.

As shown in FIG. 1, the notebook computer includes a first casing 1 and a second casing 2.

The first casing 1 houses various well-known devices to be built into a notebook computer, such as a hard disk drive and a circuit substrate having electric circuit elements mounted thereon. Detailed description and illustration thereof are omitted.

The second casing 2 includes a liquid crystal display 4 representing an exemplary display device. The first casing 1 and the second casing 2 are supported by a hinge portion 3 so as to be rotatable relative to each other. The hinge portion 3 has a pivot on which the first casing 1 and the second casing 2 are supported so as to be rotatable in the direction indicated by an arrow A or an arrow B. On a top surface 1a of the first casing 1 in the notebook computer, in a state where the notebook computer is in a used state, a keyboard 5 and a pointing device 6 are disposed. A terminal portion 10 is disposed in a side surface 1b of the first casing 1. In the following description, a direction toward a side of the first casing 1 on which the keyboard 5 is disposed when the notebook computer is being used, represents an upward direction, and, by using this as appropriate, the components will be described.

Figure 2:
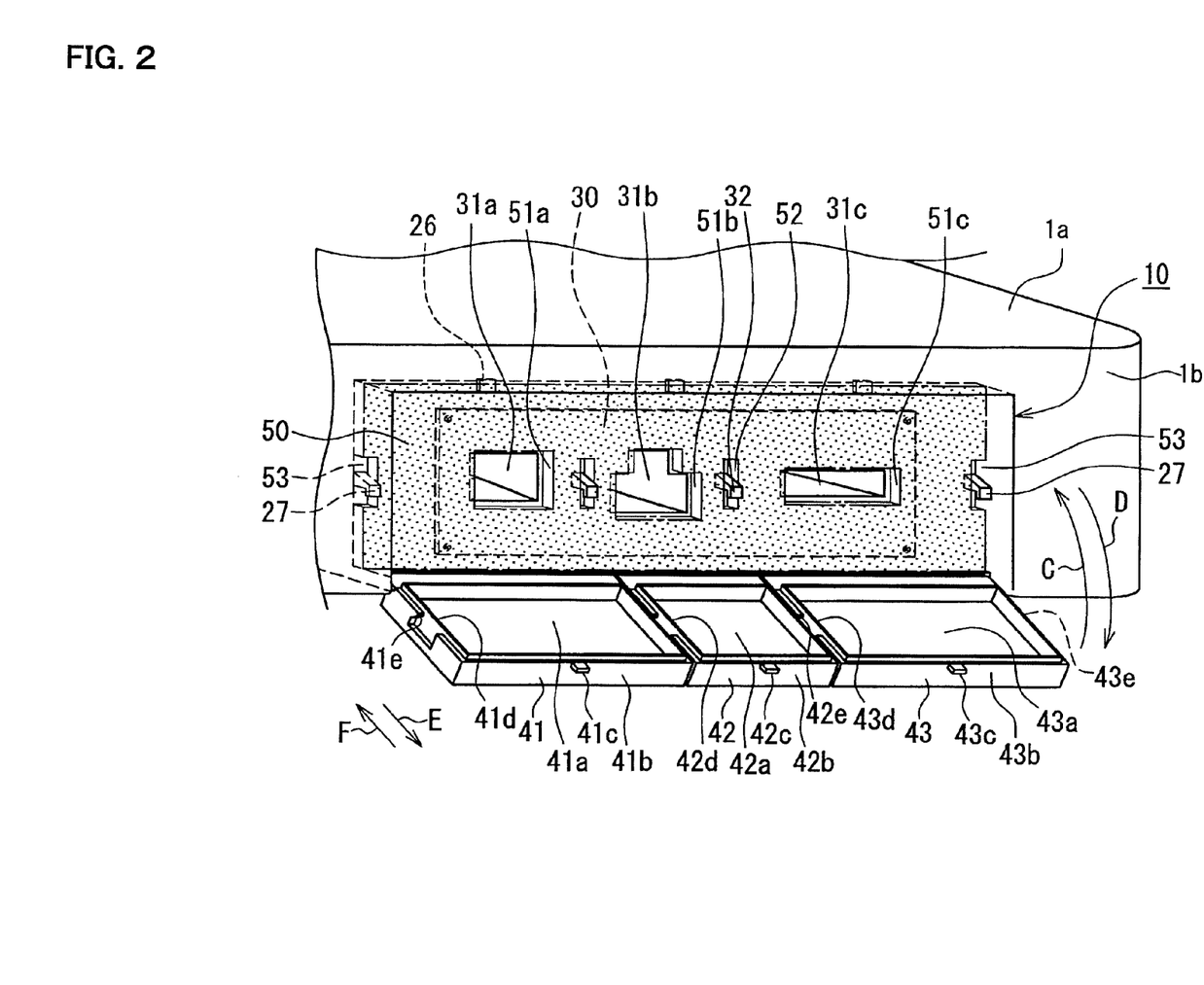
FIG. 2 is a visual field diagram illustrating a terminal portion of the notebook computer according to a first embodiment.

FIG. 2 is a perspective view of the terminal portion 10. The terminal portion 10 includes three terminals 31 (31a, 31b, 31c) formed on a terminal plate 30, described below, disposed on the side surface 1b of the first casing 1. A water sealing component 50 is disposed which has first openings 51 (51a, 51b, 51c) corresponding to portions in which the terminals 31, respectively, are disposed. Second openings 52 are formed in the water sealing component 50. Fixed projections 32 each of which is formed on the terminal plate 30 and has a hook-shaped head portion, project through the second openings 52. Further, cut portions 53 are formed on both the right and the left end portions of the water sealing component 50 as shown in FIG. 2, and fixed projections 27 each of which is formed on the first casing 1 and has a hook-shaped head portion, project through the cut portions 53.

Three lid components 41, 42, and 43 are disposed which are fixed to the first casing 1 so as to be rotatable in the direction indicated by an arrow C or an arrow D as shown in FIG. 2, and cover the terminals 31a, 31b, and 31c, respectively.

The three lid components 41, 42, and 43 include lid portions 41a, 42a, and 43a, respectively, each of which has one end portion fixed to the first casing 1; and slidable portions 41b, 42b, and 43b which are movable relative to the lid portions 41a, 42a, and 43a, respectively, in the direction away from the one end portion (the direction indicated by an arrow E shown in FIG. 2), and in the direction toward the one end portion (the direction indicate by an arrow F).

The lid components 41, 42, and 43 rotate in the direction indicated by the arrow C in FIG. 2, and ribs 41d, 42d, and 43d that are rectangular-frame-shaped and are formed on the side, of the lid portions 41a, 42a, and 43a, which oppose the water sealing component 50, abut against the peripheries of the openings 51 (51a, 51b, 51c), respectively, in the water sealing component 50. When, in this state, the slidable portions 41b, 42b, and 43b are slid in the direction indicated by the arrow E in FIG. 2 in the lid components 41, 42, and 43, respectively, projections 41c, 42c, and 43c formed on the slidable portions 41b, 42b, and 43b are inserted into recesses 26, respectively, formed in the first casing 1. Further, when engagement portions 41e, 42e, and 43e formed in the slidable portions 41b, 42b, and 43b engage with the fixed projections 27 or 32, the lid components 41, 42, and 43 are caused to be in a locked state in which the lid components 41, 42, and 43 are held by abutting against the water sealing component 50.

The water sealing component 50 has a certain elastic force, and therefore the ribs 41d, 42d, and 43d formed on the lid components 41, 42, and 43, respectively, are pressed against the water sealing component 50 in a state where the lid components 41, 42, and 43 are in the locked state, and the three terminals 31a, 31b, and 31c are blocked so as to ensure waterproof property and/or dustproof property.

Next, a structure of the terminal portion in the notebook computer according to the present embodiment will be described in detail.

Figure 3:
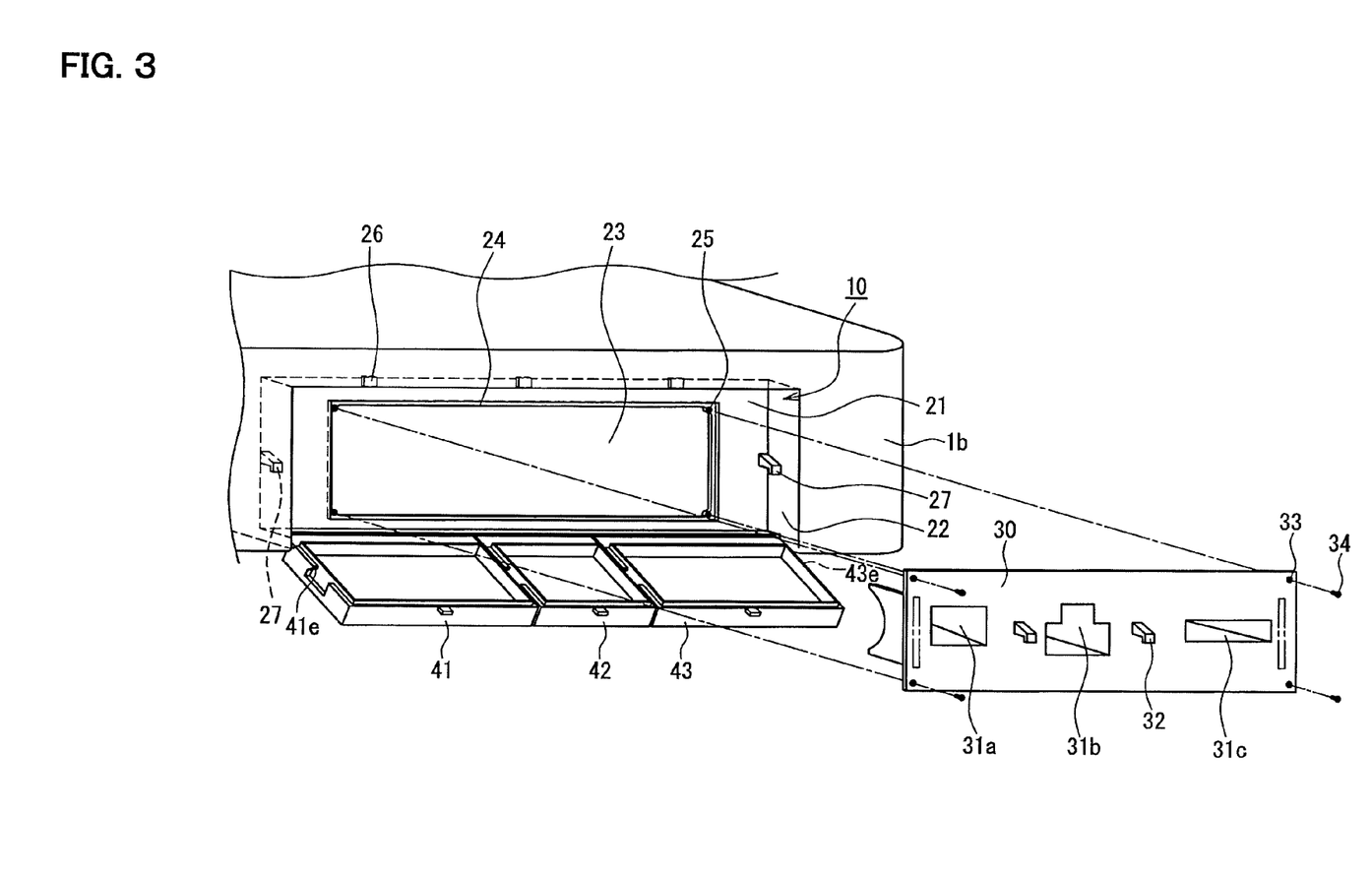
FIG. 3 illustrates structures of a casing formed in a lid component and an attachable and detachable terminal plate, in the terminal portion of the notebook computer according to the first embodiment.

FIG. 3 is a perspective view illustrating structures of a recessed portion formed in the first casing, and the terminal plate, having an expandability, which is exchangeably fixed therein, in the terminal portion of the notebook computer according to the present embodiment.

As shown in FIG. 3, a recessed portion having a bottom surface 21 and a side surface 22 is formed in the side surface 1b of the first casing 1 of the notebook computer according to the present embodiment. An opening 23 is formed in the bottom surface 21 of the recessed portion. A flange 24 is formed in a portion of the bottom surface 21 of the recessed portion that is stepped in toward the inside of the first casing 1, over the entire periphery of the opening 23, so as to surround the center of the opening 23 and to project toward the center of the opening. Screw holes 25 are formed at four corners of the flange 24.

The lid components 41, 42, and 43 are rotatably fixed to the first casing 1. Furthermore, the lid components 41, 42, and 43 have projections 41c, 42c, and 43c that are formed at front end portions of the lid components 41, 42, and 43, and that can cause the lid components 41, 42, and 43 to be locked at blocking positions so as to cover the terminals 31a, 31b, and 31c corresponding thereto, respectively. The recesses 26 into which the projections 41c, 42c, and 43c are inserted are formed in the side surface 22 above the recessed portion of the first casing 1. Moreover, the fixed projections 27 having hook-shaped head portions are formed on the bottom surface 21 of the recessed portion so as to be engageable with the engagement portions 41e and 43e formed on the side surface portions of the lid components 41 and 43 positioned on both end portions.

On the terminal plate 30 that is mountable so as to cover the opening 23, the three terminals 31a, 31b, and 31c are disposed. In the present embodiment, detailed description and illustration of an electrode terminal and a resin frame component formed inside each terminal 31 are omitted. The terminal plate 30 is placed on the flange 24 in the opening 23, and is mounted in the recessed portion of the first casing 1 by screws 34 being screwed into screw holes 33 formed at four corners of the terminal plate 30 and the screw holes 25 formed at the four corners of the flange 24 in the opening 23 of the first casing 1. Thus, the terminal plate 30 is exchangeably mounted in the opening 23 in the first casing 1.

Figure 4:
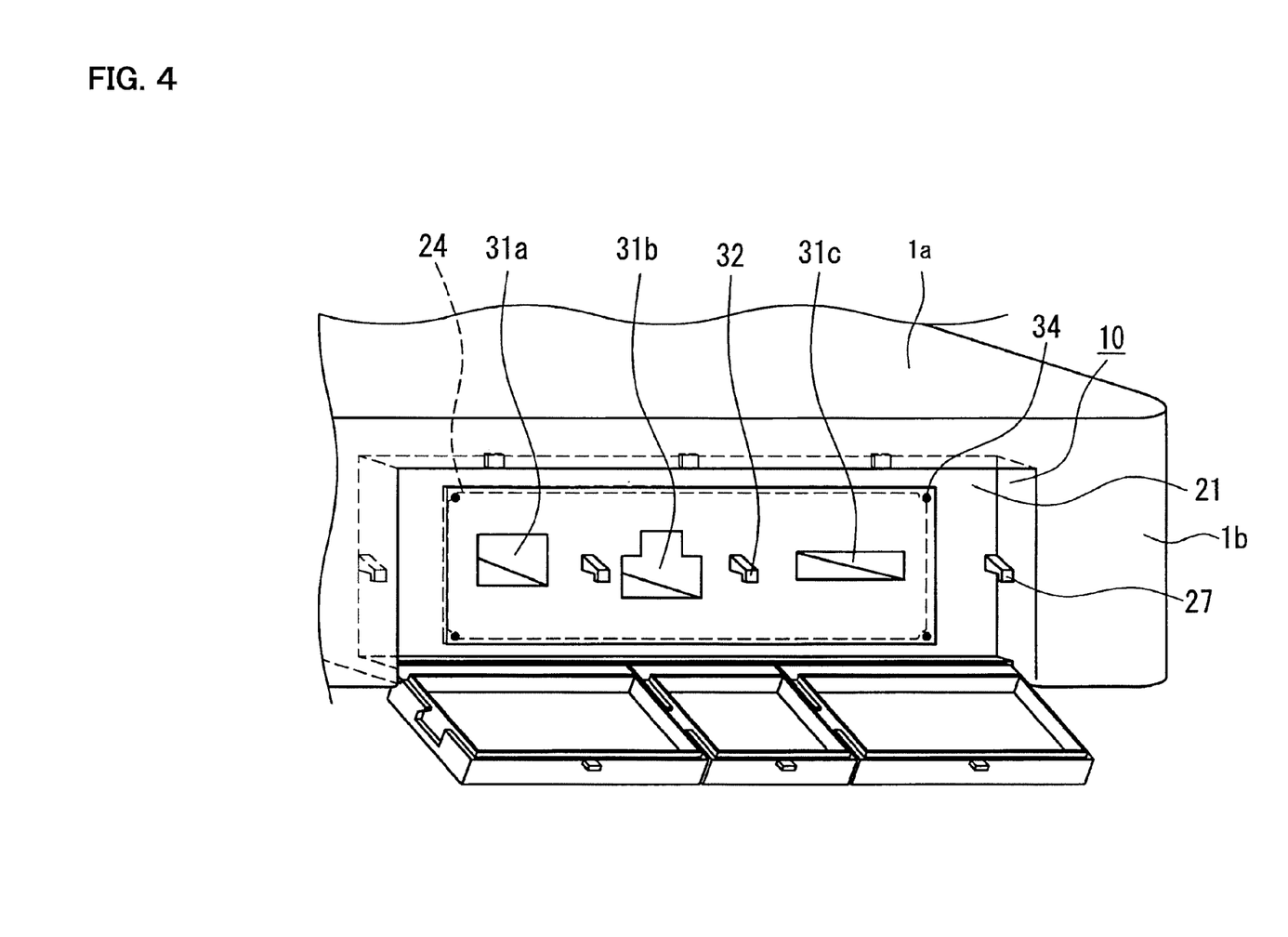
FIG. 4 illustrates a state in which the terminal plate is mounted in the casing formed in the lid component in the terminal portion of the notebook computer according to the first embodiment.

FIG. 4 illustrates a state where the terminal plate 30 is fixed to the bottom surface 21 of the recessed portion formed in the side surface 1b of the first casing 1.

The thickness of the terminal plate 30 is made equal to the depth from the bottom surface 21 of the recessed portion to the flange 24 formed around the outer periphery of the opening 23 in the bottom surface 21 of the recessed portion. Therefore, in a state where the terminal plate 30 is mounted on the flange 24, the outer side surface of the terminal plate 30 is flush with the bottom surface 21 of the recessed portion. Namely, in a state where the terminal plate 30 is disposed and fixed at the outer periphery of the opening 23 of the recessed portion, the terminals 31 are disposed on a plane that is coplanar with the bottom surface 21 of the recessed portion. Furthermore, the fixed projections 32 formed on the terminal plate 30 and the fixed projections 27 formed on the bottom surface 21 of the recessed portion in the first casing 1 are disposed on the same plane, and the head of each fixed projection 32 and the head of each fixed projection 27 are level with each other. That the outer side surface of the terminal plate 30 having the fixed projections 32 formed thereon is flush with the bottom surface 21 of the recessed portion formed in the first casing 1 means that the surfaces are level with each other so that the actual products are easier to use, as well as that the two surfaces are strictly flush with each other.

Figure 5:
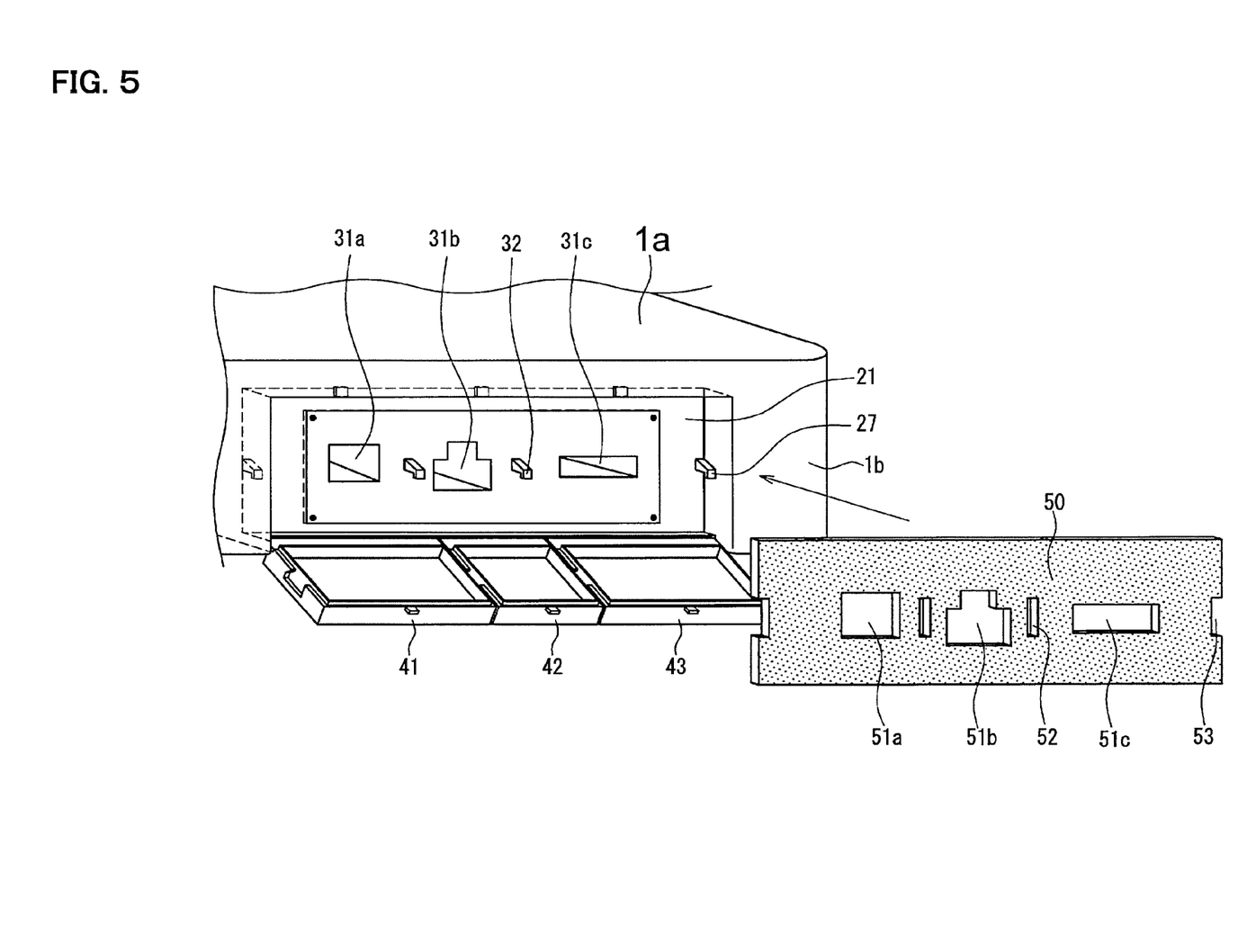
FIG. 5 illustrates a state in which a water sealing component is disposed on the terminal plate in the terminal portion of the notebook computer according to the first embodiment.

As shown in FIG. 5, the water sealing component 50 is fixed so as to cover the bottom surface 21 of the recessed portion formed in the first casing 1, and the outer side surface of the terminal plate 30. The water sealing component 50 is formed of a material having a predetermined elasticity so as to ensure waterproof property and/or dustproof property when the lid components 41, 42, and 43 are locked at blocking positions. Furthermore, the water sealing component 50 is fixed to the bottom surface 21 of the recessed portion and the outer side surface of the terminal plate 30 by, for example, an adhesive being applied to or a double-sided tape being attached to the reverse side surface of the water sealing component 50, that is, the surface of the water sealing component 50 on a side thereof that opposes the first casing 1. The water sealing component 50 is formed of such a material as to allow the terminals 31 to be reliably waterproof, and may be formed of, for example, a silicone foam. While the water sealing component 50 may be attached to the bottom surface 21 of the recessed portion and the outer side surface of the terminal plate 30 by means of an adhesive tape or the like, the water sealing component 50 may be attached thereto by adhering means having water sealing properties in order to prevent entry of at least a liquid in between the water sealing component 50 and each of the bottom surface 21 of the recessed portion and the terminal plate 30. In the present embodiment, the term, water sealing component, is used. However, the "water sealing component" represents a component that is able to prevent the entry of various liquids and solids, as well as water, regardless of the term. Namely, the water sealing component represents a component having waterproof (resistance to liquids, drips, etc.) and dustproof properties, and the terminals 31 of the terminal plate 30 are covered with the lid components 41, 42, and 43 by using the water sealing component, to prevent entry of a liquid, a foreign object, or the like into the terminals 31 so as to prevent electrical short-circuiting in the terminals 31.

The water sealing component 50 has the first openings 51 (51a, 51b, 51c) formed so as to correspond to positions at which the three terminals 31a, 31b, and 31c are disposed, and have an allowance for allowing connectors of cables to be mounted to the three terminals 31a, 31b, and 31c, respectively. Further, the water sealing component 50 has formed therein the two second openings 52 through which the fixed projections 32 formed on the terminal plate 30 project. The cut portions 53 are formed on both the left and the right end portions of the water sealing component 50, and the two fixed projections 27 formed on the bottom surface 21 of the recessed portion in the first casing 1 project through the cut portions 53.

The water sealing component 50 is attached so as to cover the bottom surface 21 of the recessed portion formed in the side surface 1b of the first casing 1, and the outer side surface of the terminal plate 30 fixed so as to block the opening 23 formed in the bottom surface 21 of the recessed portion, thereby constructing the terminal portion 10 shown in FIG. 2.

Figure 6:
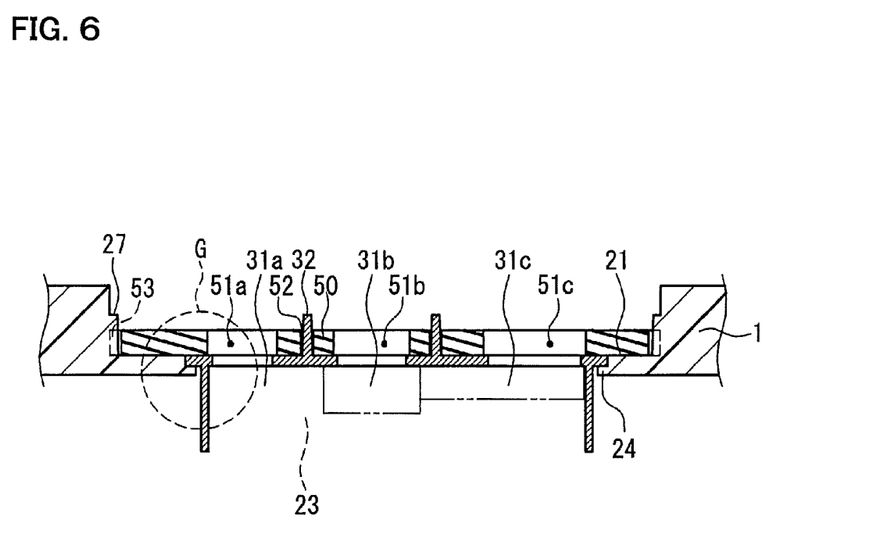
FIG. 6 is a cross-sectional view of a main structure of the terminal portion of the notebook computer according to the first embodiment.

FIG. 6 is an enlarged cross-sectional view of a main structure of the terminal portion 10 of the notebook computer. FIG. 6 shows a cross-sectional structure of a center line portion of the terminal plate 30 disposed in the terminal portion 10 as taken along the center line parallel to the top surface 1a of the first casing 1 (that is, the lateral direction in FIG. 2).

As shown in FIG. 6, the terminal plate 30 is placed on the flange 24 and fixed so as to block the opening 23 formed in the bottom surface 21 of the recessed portion in the first casing 1. The water sealing component 50 is disposed so as to cover a surface formed by the bottom surface 21 of the recessed portion and the outer side surface of the terminal plate 30.

The water sealing component 50 have the first openings 51 (51a, 51b, 51c) each of which is formed so as to have an area slightly greater than an area of the terminal 31, and which have an allowance in size for allowing the connectors to connect to the terminals 31 (31a, 31b, and 31c), respectively, formed on the terminal plate 30. The water sealing component 50 is disposed so as to cover a boundary portion between the terminal plate 30 and the bottom surface 21 of the recessed portion of the first casing 1, that is, so as to cover the outer periphery portion of the terminal plate 30. The fixed projections 32 formed on the terminal plate 30 penetrate through the second openings 52 in the water sealing component 50, the fixed projections 27 formed in the bottom surface 21 of the recessed portion penetrate through the cut portions 53 of the water sealing component 50, and the height of each fixed projection 32 from the bottom surface 21 is equal to the height of each fixed projection 27 from the bottom surface 21.

Figure 7:
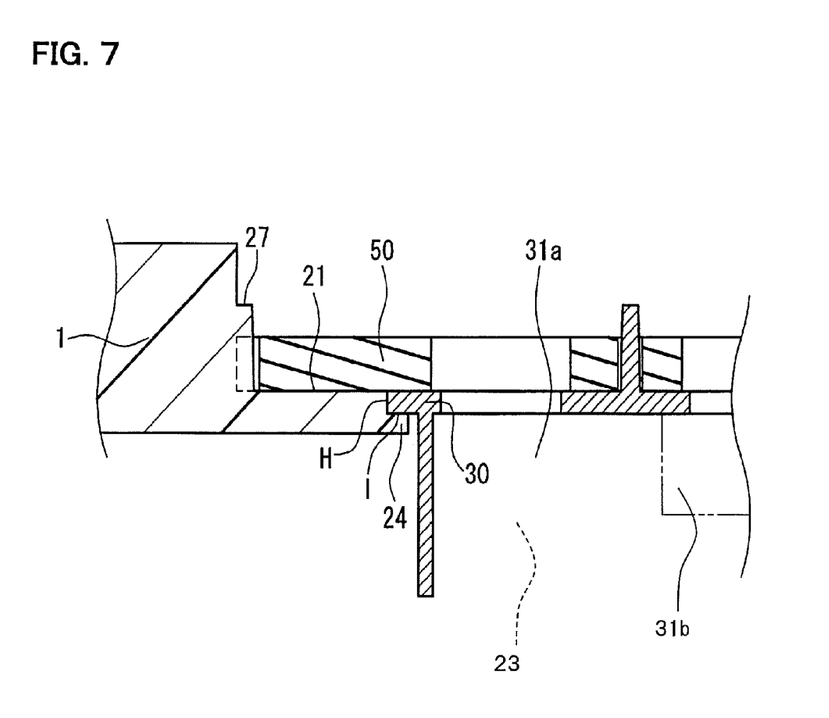
FIG. 7 is an enlarged cross-sectional view of a main structure of a peripheral portion of the terminal plate of the terminal portion in the notebook computer according to the first embodiment.

FIG. 7 is an enlarged cross-sectional view illustrating in more detail a main structure of a region G portion shown in FIG. 6, and a relationship in disposition between the water sealing component 50 and each of the bottom surface 21 of the recessed portion of the first casing 1 and the terminal plate 30.

As shown in FIG. 7, the flange 24 is formed in the opening 23 formed in the bottom surface 21 such that the flange 24 is spaced from the bottom surface 21 by a predetermined depth dimension. Therefore, in the boundary portion between the first casing 1 and the terminal plate 30, a portion on a side (the bottom surface 21 side) facing the exterior of the first casing 1 and a portion on a side facing an inner surface side (a side facing the inside of the opening 23) of the terminal plate 30 does not form a straight line, and the boundary portion includes a portion (an H portion in FIG. 7) along the direction perpendicular to the bottom surface 21 of the recessed portion formed in the first casing 1, and a portion (an I portion in FIG. 7) along the direction parallel to the bottom surface 21, so as to be shaped like a so-called crank. The bottom surface 21 of the recessed portion of the first casing 1 is flush with the outer side surface of the terminal plate 30. Therefore, the boundary portion between the first casing 1 and the terminal plate 30 is assuredly covered with the water sealing component 50. Thus, in the connection portion 10 of the notebook computer, the outer side surface of the terminal plate 30 is flush with the bottom surface 21, of the first casing 1, in which the opening 23 is formed, and the boundary portion, between the terminal plate 30 and the first casing 1, corresponding to the outer periphery portion of the terminal plate 30, is covered with the water sealing component 50. Therefore, although a small gap occurs between the outer diameter of the terminal plate 30 and the inner diameter of the opening 23 in the bottom surface 21 of the recessed portion in the first casing 1, for exchanging the terminal plate 30, waterproof property and/or dustproof property can be favorably ensured. Therefore, the connection portion 10 of the notebook computer is allowed to have a terminal, as intended, by exchanging the terminal plate 30 having the terminals 31 formed therein to another type of terminal plate, while maintaining enhanced waterproof property and/or dustproof property.

For the present embodiment, the terminal portion 10 for allowing the terminal plate 30 including the three terminals 31 to be exchanged, is described as an example. However, the terminal portion 10 may have a structure in which, for example, terminal plates each having one terminal may be exchangeably fixed in at least one opening formed in the bottom surface of the recessed portion in the first casing 1.

Figure 8:
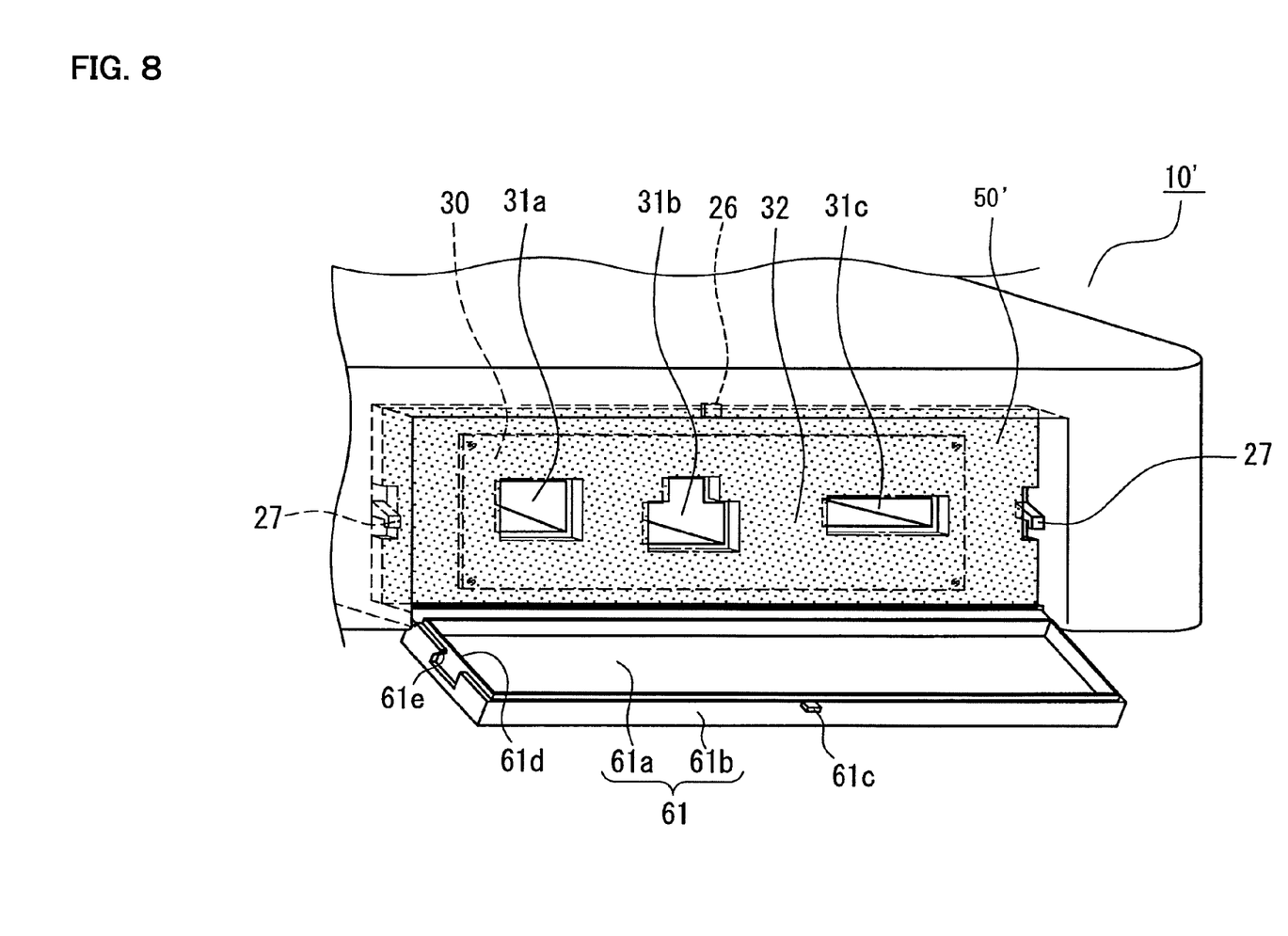
FIG. 8 is a perspective view of a lid component, having another structure, of the terminal portion in the notebook computer according to the first embodiment.

As shown in FIG. 8, a terminal portion 10' may be used which has a structure in which the terminal plate 30 has the three terminals 31 (31a, 31b, and 31c), and the three terminals 31 are collectively covered by a lid component 61 having an increased width. Also in this structure, similarly to the lid components 41, 42, and 43 described with reference to FIG. 2, the lid component 61 includes: a lid portion 61a which has one end portion fixed to the first casing 1 so as to allow the lid component 61 to be rotatable, and has a rib 61d that is rectangular-frame-shaped and abuts against a water sealing component 50'; and a slidable portion 61b disposed so as to be movable relative to the lid portion 61a. When a projection 61c formed at the front end portion of the slidable portion 61b engages with the recess 26 formed in the first casing 1, and, simultaneously, engagement portions 61e formed in the side surfaces of the slidable portion 61b engage with the engagement projections 27 formed in the first casing 1, the lid component 61 can be locked relative to the first casing 1.

Further, as the lid component for covering the terminals, an exemplary lid component has been described which includes: a lid portion having one end portion fixed to the first casing; and a slidable portion movable relative to the lid portion. However, the form of the lid component is not limited to that described above. The lid component may be any of lid components which are structured to cover the terminals and to be able to be held by abutting against the water sealing component surrounding the terminals, and the opening and closing mechanism and the locking mechanism of the lid component are not limited to any specific mechanisms. Any of various structures that can achieve waterproof property and/or dustproof property to be obtained for the electronic devices, can be used.

In the present embodiment, the water sealing components 50 and 50' are formed of a silicone foam. However, the water sealing components 50 and 50' may be formed of a material that at least has an elasticity exhibiting recoverability and can prevent entry of a liquid. The water sealing component 50 may be formed of a single material so as to function as a water seal and/or a dust seal. The water sealing component 50 may be formed by using a silicone rubber, a nitrile rubber, or the like as a material that has an elasticity exhibiting recoverability.

Furthermore, in the present embodiment, the water sealing component formed of a silicone foam is provided. However, in general, a silicone foam does not have so high resistance to impact from the exterior. Therefore, the water sealing component may have a protective film formed on its surface.

Second Embodiment

Hereinafter, a second embodiment will be described.

A notebook computer of the present embodiment includes a terminal plate that is exchangeably mounted in an opening formed in a casing, and includes no lid component for covering the terminal plate.

Figure 9:
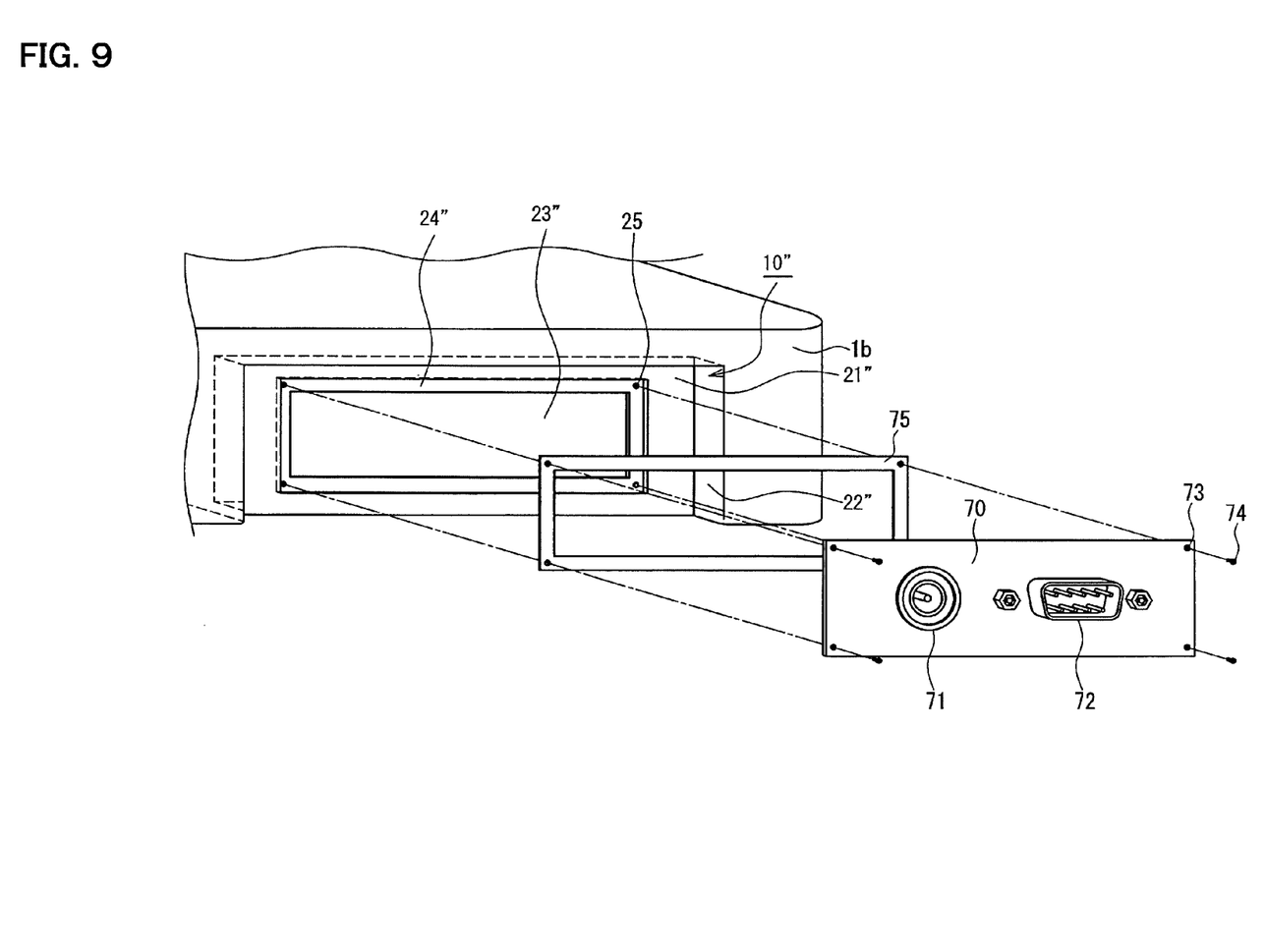
FIG. 9 illustrates structures of a casing formed in a lid component and an attachable and detachable terminal plate, in a terminal portion of a notebook computer according to a second embodiment.

FIG. 9 shows a structure of a terminal portion of the notebook computer according to the present embodiment. FIG. 9 corresponds to FIG. 3 that shows the first embodiment in which the opening 23 is formed in the first casing 1 and the terminal plate 30 is mounted in the opening 23.

In the notebook computer shown in FIG. 9, terminals 71 and 72 mounted to a terminal plate 70 are waterproof, and the terminal plate 70 is mounted to a terminal portion 10".

As shown in FIG. 9, also in the notebook computer, a recessed portion having a bottom surface 21" and a side surface 22" is formed in the side surface 1b of the first casing 1, and an opening 23" is formed in the bottom surface 21" of the recessed portion. A flange 24" is formed in a portion of the bottom surface 21" of the recessed portion that is stepped in toward the inside of the first casing 1, over the entire periphery of the opening 23", so as to surround the center of the opening and to project toward the center of the opening 23". Screw holes 25 are formed at four corners of the flange 24".

The two terminals 71 and 72 are disposed on the terminal plate 70 that is exchangeably mountable so as to cover the opening 23". The terminals 71 and 72 disposed on the terminal plate 70 of the present embodiment are, for example, an AC adaptor terminal or an extension connector terminal, and are waterproof terminals that can prevent entry of water through the terminal portion. Screw holes 73 are formed at four corners of the terminal plate 70, and the screw holes 73 of the terminal plate 70 and the screw holes 25 formed at the four corners of the flange 24" in the opening 23" of the first casing 1, are used. The terminal plate 70 is placed on the flange 24" in the opening 23", and is mounted in the recessed portion of the first casing 1 by the use of screws 74.

A second water sealing component 75 is disposed in a portion in which the terminal plate 70 and the flange 24" formed in the opening 23" abut against each other. The second water sealing component 75 is sandwiched between a surface of the flange 24" on the terminal plate 70 side, and a portion of the terminal plate 70 which opposes the flange 24", that is, an edge portion of the reverse side surface of the terminal plate 70, thereby preventing entry of water or dust into the first casing 1 in between the terminal plate 70 and the flange 24".

Figure 10:
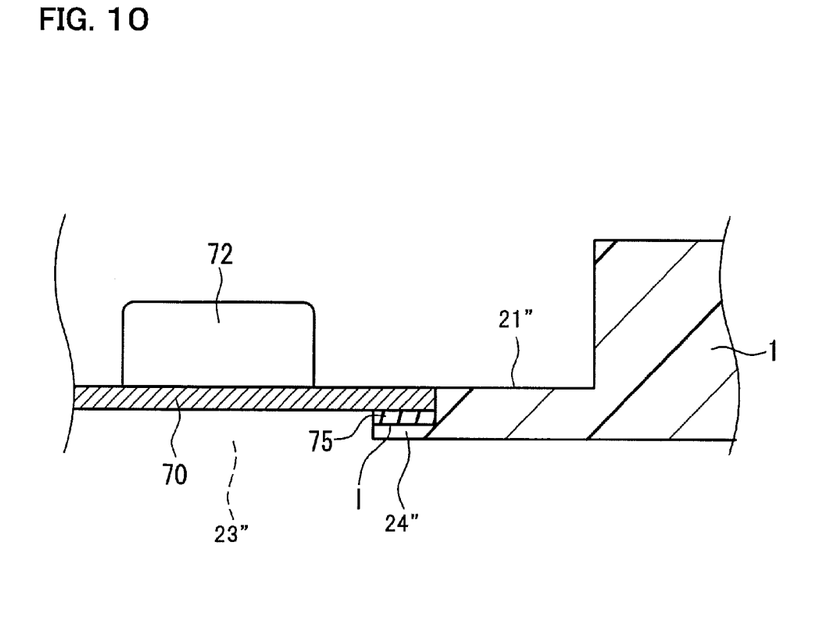
FIG. 10 is an enlarged cross-sectional view of a main structure of a peripheral portion of the terminal plate of the terminal portion in the notebook computer according to the second embodiment.

FIG. 10 is an enlarged cross-sectional view illustrating in more detail a main structure of and a relationship in disposition between the water sealing component 75, and each of the terminal plate 70 and the bottom surface 21" of the recessed portion in the first casing 1, in the notebook computer according to the present embodiment. FIG. 10 corresponds to FIG. 7 for describing the first embodiment.

As shown in FIG. 10, the flange 24" is formed in the opening 23" of the bottom surface 21" such that the flange 24" is spaced from the bottom surface 21" by a predetermined depth dimension and projects toward the center of the opening. Therefore, as in the first embodiment, in the boundary portion between the first casing 1 and the terminal plate 70, a portion on a side facing the exterior of the first casing 1 and a portion on a side facing an inside of the first casing 1 do not form a straight line, and the boundary portion includes portions along two directions, that is, a portion along the direction perpendicular to the bottom surface 21" of the recessed portion formed in the first casing 1, and a portion along the surface direction of the bottom surface 21", so as to be shaped like a so-called crank. In the terminal portion 10" of the notebook computer according to the present embodiment, the second water sealing component 75 is disposed in a portion extending in the surface direction of the bottom surface 21", in the crank-shaped boundary portion formed by the first casing 1 and the terminal plate 70. Thus, an entry path of water or dust which connects between the inside and the exterior of the first casing 1 can be blocked. Therefore, a notebook computer can be realized which is waterproof and/or dustproof regardless of a gap occurring between the outer diameter of the terminal plate 70 and the inner diameter of the opening 23" in the bottom surface 21" of the recessed portion in the first casing 1, for enabling the terminal plate 70 to be exchanged.

For the second water sealing component 75, a sheet component having adhesiveness on both side surfaces, such as a double-sided tape, may be used. A double-sided tape serves so as to prevent occurrence of a gap between the flange 24" and the terminal plate 70, and therefore the double-sided tape formed as a thin component may exhibit a predetermined waterproof property. Furthermore, as the second water sealing component 75, similarly to the water sealing component 50 of the first embodiment, for example, a sheet formed of a silicone foam which is a reliably waterproof material may be used.

As described above, the notebook computer of the present embodiment can be also realized so as to have an expandability for allowing a terminal to be mounted as intended by exchanging the terminal plate 70 having the terminals 71 and 72 formed thereon, and to allow the terminal portion 10" to be reliably waterproof and/or dustproof.

Referring to FIG. 9 and FIG. 10, a structure is described in which, since a lid component is not provided in the present embodiment, the recesses 26 and the fixed projections 27 are not formed for holding, in the locked state, the lid component formed in the first casing 1. However, in a case where, since, for example, screws are screwed to fix the lid component to the first casing 1, the lid component can be easily removed when unnecessary, the recesses 26 and the fixed projections 27 may be formed in the first casing 1 such that the terminal plate 30 having terminals which are covered with the lid component for enabling waterproof property to be obtained as described in the first embodiment, and the terminal plate 70 having waterproof terminals as described in the present embodiment may be both used as the terminal plate 70 mounted in the opening 23". In this case, an electronic device that can have a terminal which is selected, as intended, from among a wide range of terminals can be obtained, thereby realizing a greatly enhanced expandability.

In the two embodiments as described above, an exemplary case is described in which the openings 23 and 23" in which the terminal plates 30 and 70 are fixed, are formed in the bottom surfaces 21 and 21" of the recessed portion formed in the side surface 1b of the first casing 1. However, the openings 23 and 23" in which the terminal plates 30 and 70 are fixed may be formed in the side surface 1b of the first casing 1 without forming the recessed portion. The openings 23 and 23" may be formed on another surface of the first casing.

Furthermore, a case has been described in which the shape of the opening, that is, the outer form of the terminal plate, is a roughly rectangular shape having slightly curved corners. However, the terminal plate may have any shape, as appropriate, according to, for example, the size and shape of the produced terminal, a position at which the terminal is disposed on the terminal plate, and a state where other electronic devices are disposed in the first casing. Furthermore, a case is described in which the flange is formed inside the opening so as to have the projection having an almost uniform width at the entirety of the inner periphery of the opening. However, the width of the projection of the flange may not be uniform in the peripheral direction of the opening. The width thereof may be determined as appropriate in view of the shape of the terminal plate, the shape of the terminal that projects from the reverse side of the terminal plate, and prevention of interference to another electronic device disposed inside the first casing. In this case, although the flange may be formed at the entirety of the inner periphery of the opening, if the flange cannot be formed at the entirety of the inner periphery of the opening due to, for example, interference to another electronic device in the first casing 1, a small area in which no flange is formed may be contained as long as deterioration of waterproof property and/or dustproof property in that area can be prevented.

Moreover, in the two embodiments as described above, the notebook computer is described as an exemplary electronic device. However, the electronic device may be any of devices which at least include an opening formed in a casing, a terminal plate which is exchangeably mounted in the opening, and a lid component for covering terminals on the terminal plate. The present disclosure is applicable to various terminals mounted to, for example, mobile telephone terminals, hand-held game devices, digital cameras, other portable navigators, and other electronic devices.

The electronic device according to the present disclosure includes: a casing; a terminal plate that is exchangeably mounted in an opening formed in the casing; and a water sealing component disposed around terminals formed on the terminal plate. A flange is formed inside the opening so as to surround the center of the opening and project toward the center of the opening. When the terminal plate is mounted on the flange, the outer side surface of the terminal plate is flush with the surface of the casing in a portion where the opening is formed.

In the electronic device according to the present disclosure, the terminal plate having terminals formed thereon is exchangeably mounted in the opening formed in the casing. Therefore, a terminal selected by a user as appropriate can be mounted to the electronic device. Furthermore, when the terminal plate is mounted on the flange formed inside the opening so as to surround the center of the opening, the outer side surface of the terminal plate is flush with the surface of the casing. Therefore, not only when the water sealing component is disposed on the terminal plate on the outer side thereof and the terminals are covered with the lid component, but also when the water sealing component is disposed on the terminal plate on the inner side thereof, entry of water or the like into the casing through a gap which occurs in the peripheral portion of the terminal plate due to attachment and detachment being possible, can be prevented, thereby realizing not only expandability but also waterproof property and/or dustproof property.

Furthermore, the electronic device as described above may further include a lid component that covers the terminals formed on the terminal plate, and that is held by abutting against the water sealing component, to enable the water sealing component to cover the outer periphery portion of the terminal plate. Thus, the water sealing component against which the lid component abuts is allowed to cover the boundary portion between the terminal plate and the casing, thereby enabling waterproof property and/or dustproof property to be enhanced.

Further, the lid component includes: a lid portion that has one end portion fixed to the casing, and abuts against the water sealing component; and a slidable portion that is movable relative to the lid portion in the direction away from the one end portion and in the direction toward the one end portion. The slidable portion is moved in the direction away from the one end portion, and the lid component is held by abutting against the water sealing component. Thus, in a series of operations in which the lid component is rotated and the slidable portion is slid, the lid component can be held by abutting against the water sealing component, thereby obtaining a reliably waterproof and/or dustproof terminal portion.

Furthermore, the water sealing component may be structured to be disposed between the flange formed inside the opening, and a portion of the terminal plate which opposes the flange. Thus, entry of water or the like from a boundary portion between the casing and the terminal plate can be effectively prevented.

In this case, the water sealing component may be a sheet component having adhesiveness on both side surfaces.

As described above, the embodiments have been described as an exemplary technique of the present disclosure. For that purpose, the accompanying drawings and the detailed description are provided.

Therefore, components indicated in the accompanying drawings and the detailed description may include not only components which need to be provided in order to solve the problems, but also components which need to be illustrated for describing the technique but may not be provided for solving the problems. Therefore, the components which may not be provided should not be instantly construed as being indispensable even if the components which may not be provided are indicated in the accompanying drawings and the detailed description.

Further, the embodiments described above are intended to illustrate the technique of the present disclosure. Various modifications, replacements, additions, and deletions may be devised within the scope of claims or within the equivalent scope.

What is claimed is:

1. An electronic device, comprising:
   a casing;
   an opening in a first surface of the casing;
   a lid component that covers the opening;
   a flange formed inside the opening so as to surround a center of the opening and to project toward the center of the opening;
   a terminal plate that is exchangeably mountable on the flange;
   a terminal formed on the terminal plate; and
   a water sealing component configured to cover a boundary portion between the flange and a second surface of the casing; wherein
   with the terminal plate being mounted on the flange, an outer-side surface of the terminal plate is flush with the second surface of the casing.

2. The electronic device according to claim 1, wherein the water sealing component is disposed between the flange formed inside the opening, and a portion of the terminal plate which opposes the flange.

3. The electronic device according to claim 2, wherein the water sealing component is a sheet component having adhesiveness on both side surfaces.

4. The electronic device according to claim 1, wherein the water sealing component is disposed so as to correspond to the position of the terminal and has an opening.

* * * * *